United States Patent Office 3,605,856
Patented Sept. 20, 1971

3,605,856
METHOD FOR INOCULATING INVESTMENT CASTING MOLD
Lynn D. Boreland, Minerva, and George V. Ward, East Liverpool, Ohio, assignors to TRW Inc., Cleveland, Ohio
No Drawing. Filed May 22, 1969, Ser. No. 827,050
Int. Cl. B22c 9/04
U.S. Cl. 164—24         10 Claims

ABSTRACT OF THE DISCLOSURE

Method of forming an investment mold wherein a destructible pattern is coated with refractory particles, and a backup material is applied against the resulting coating, the backup material containing refractory particles having particles of a nucleation catalyst adhering thereto. The remainder of the mold assembly is then built up in conventional fashion and, upon completion, the pattern is removed from the mold and the mold is ready for the reception of molten metal.

BACKGROUND OF THE INVENTION

Field of the invention

The present invention is in the field of making precision investment casting molds for securing fine grained cast structures and involves incorporating finely divided particles of a nucleation catalyst in a sand backup as a part of the mold making procedure.

Description of the prior art

There are numerous suggestions in the prior art regarding means to produce fine grained cast structures in metal castings. In some cases, this involves dispersing nuclei which are compatible with the crystallographic structure of the metal into the melt to initiate the formation of fine grain crystal development. In other instances, there have been disclosures of using ultrasonic wave energy and high frequency electromagnetic energy for accomplishing this purpose.

There are also prior art disclosures of incorporating nucleation catalysts into the investment mold as part of the mold making procedure. Examples of such disclosures will be found in Horton et al., U.S. Pat. No. 3,019,497; Horton et al., U.S. Pat. No. 3,157,926; Schweikert, U.S. Pat. No. 3,158,912; and Feagin, U.S. Pat. No. 3,259,948. In these disclosures, however, the nucleation catalyst is contained in the prime dipcoat, that is, the first coating suspension in which the pattern is dipped. Such coating suspensions contain various organic additives in addition to the refractory particles and the nucleation catalyst particles. Consequently, there is a tendency for the slurry to gel. It is common for the slurry to change its pH and ultimately for the suspended particles to agglomerate. As a result, such slurries are not considered to be useful for periods of time in excess of about 72 hours and if they are not used in that period, they must be discarded. Since the nucleation catalysts comprise a significant proportion of the slurry, and since such catalysts are fairly expensive, this represents a significant cost factor.

SUMMARY OF THE INVENTION

The present invention provides an improved method of incorporating the nucleation catalyst into a mold making procedure. Instead of putting the nucleation catalyst in the prime dip, it has been found advantageous to incorporate the nucleation catalyst particles in the first sand backup which is applied after the prime dip has been applied as a coating to the pattern. The nucleation catalyst and the sand are applied in a unique form, as tiny aggregates of sand particles and nucleation catalyst particles, held together by means of a suitable binder such as a siliceous bonding agent. The combination of nucleation catalyst and sand particles in this form can be stored indefinitely and if any settling should occur after extended periods, it can be remixed to again provide a uniform dispersion of the catalystic particles through the mass of backup sand.

DESCRIPTION OF THE PREFERRED EMBODIMENTS

In accordance with the present invention, a destructible pattern is first made in the usual way, the pattern normally consisting of wax or a plastic material such as polystyrene. Then, the pattern is dipped or otherwise coated with a prime slurry which contains refractory particles, a binding agent and, normally, de-airing, wetting, and suspension agents. For example, the refractory particles may be composed of zircon of a particle size of $-140$ mesh or so although other refractory materials such as alumina, magnesia and the like can also be used. The prime dip may be composed, for example, of about 80% by weight of the zircon, and 20% by weight of a silica sol. The latter is usually composed of 30% by weight of silica and 70% water.

For the purposes of the present invention, it is desirable to use a prime dip which is less viscous than the prime dips which have heretofore been used. Specifically, we have found that the best results are obtained when the viscosity range for the prime dip is in the range from 8 to 14 seconds when measured with a Zahn No. 4 cup.

While the prime dip coating on the pattern is still wet and adhesive, the first sand backup coating is applied. It is in this coating that we include the nucleation catalyst in an amount of from 1 to 50% by weight or preferably from 2 to 15% by weight. The catalyst may be metallic nickel or cobalt, oxides of nickel, cobalt or iron, silicates of cobalt, nickel, iron, or copper, or mixtures of any of the foregoing when casting a nickel base alloy. The nucleation catalyst is applied in the form of minute aggregates in combination with the sand backup material. It is important for the purposes of the present invention that the nucleation catalyst be very finely divided. In any event, the catalyst particles should be less than 300 mesh, and should preferably not exceed 40 microns in maximum dimension. The finely divided catalytic particles can be combined with these refractory particles, such as zircon sand, by mixing the zircon sand with the finely divided catalyst powder in the presence of a binder such as colloidal silica. The silica will normally be present in amounts ranging from about 1 to 10% by weight of the zircon sand present. The resulting mixture is then dried and sized by passing through a 35 mesh screen. When operating in this manner, it has been found that substantially all particles of zircon sand have at least one particle of the catalyst attached to it.

The first sand backup is preferably dusted onto the still adherent prime coat by suspending the aggregates of sand and catalytic particles in a fluidized stream and holding the coated pattern in the fluidized suspension until a uniform coating of the sand-catalytic particles aggregates appears over the prime dip coating. The aggregates may also be applied by means of a spray gun although this is not quite as satisfactory as the use of a fluidized suspension.

The succeeding steps of the mold making operation are the same as have heretofore been used in the build-up of a precision investment casting mold, that is, the dusted wet refractory layer on the pattern is suspended on a conveyor and moved through a drying oven having a controlled humidity and temperature, wherein the coated pattern is dried adiabatically. The steps of dipping, dusting and adiabatic drying are then repeated (without the inclusion of the catalytic material in the refractory used for dusting) employing air at progressively lower humidities for drying succeeding coats. For example, the first two coats can be dried with air having a relative humidity of about 45 to 55%. The third and fourth coats can be dried at a relative humidity of 35 to 45%, the fifth and sixth coats with a relative humidity of 25 to 30%, and the final coats with a relative humidity of 15 to 25%.

The initial dipcoat layer is preferably applied to a thickness of about 0.005 to 0.020 inch, and the thickness of each of the succeeding layers is usually in that range.

After the mold is built up on the pattern material, the pattern can be removed by heat and then the green mold is ready for firing. Alternatively, steam under pressure can be used to effect removal of the pattern material. The molds are fired at temperatures on the order of 1500 or 1900° F., in the final step of the process. Then, they are ready for the reception of molten metal and, for that purpose, usually preheated to temperatures in excess of 1000° F.

The process of the present invention is applicable for many different types of alloys and finds particular utility in the casting of the so-called "superalloys" some of which are decribed in the June 1967 issue of "Metal Progress," starting at page 86.

The following specific example is submitted as illustrative of the invention, although it will be recognized that variations and modifications can be made without departing from the spirit and scope of the novel concepts of the invention.

EXAMPLE

Cobalt powder analyzing an excess of 99.5% Co was used as a nucleation catalyst. The finely divided cobalt powder was re-milled from about its normal particle size of about 300 mesh to produce an extremely finely divided material. This finely divided material was mixed with prime zircon sand which was wetted with 4% by weight of colloidal silica. The cobalt was present in an amount of about 10% by weight of the zircon sand. The resulting mixture was then dried and sized by passing through a 35 mesh screen.

A wax pattern was initially dipped in a prime coat containing 80% by weight of −140 mesh zircon and 20% by weight of a silica sol which contained 30% by weight of silica flour. The composition also included de-airing, wetting and suspension agents. While the prime dipcoat was still wet, the aggregates of cobalt powder and zircon were dusted onto the prime dip coating and adhered uniformly thereto. The mold was then built up with a total of 7 coatings being applied, followed by a final seal coat.

After removal of the pattern and the firing of the mold, a molten nickel base superalloy was cast into the mold. The superalloy employed analyzed 0.10% carbon, 8.0% chromium, 10.0% cobalt, 6.0% molybdenum, 4.0% tantalum, 1.0% titanium, 6.0% aluminum, 0.015% boron, 0.10% zirconium and the balance essentially nickel. The casting which resulted showed a uniformly fine grain structure.

We claim as our invention:

1. The method of forming an investment mold which comprises providing a destructible pattern, applying a low viscosity refractory particle slurry to provide a coating of refractory particles over said pattern, applying a sand backup material against the resulting coating, said backup material including refractory particles having particles of a nucleation catalyst adhering thereto, building up an investment mold about said backup material, and thereafter removing the pattern from the mold thus produced.

2. The method of claim 1 in which said particles of nucleation catalyst are adhered to said refractory particles by the medium of a siliceous bonding agent.

3. The method of claim 1 in which the backup material has a particle size of less than about 35 mesh.

4. The method of claim 1 in which said particles of nucleation catalyst have a particle size of substantially less than 300 mesh.

5. The method of claim 1 in which said nucleation catalyst is metallic cobalt.

6. The method of claim 1 in which said nucleation catalyst is metallic nickel.

7. The method of claim 1 in which said particles of nucleation catalyst constitute from 1 to 50% by weight of said backup material.

8. The method of claim 1 in which said particles of nucleation catalyst constitute from 2 to 15% by weight of said backup material.

9. The method of claim 1 in which the initial coating of refractory particles applied to said pattern is in the form of a slurry having a viscosity of from 8 to 14 seconds as measured with a No. 4 Zahn cup.

10. The method of forming an investment mold which comprises providing a destructible pattern, coating the surface of said pattern with a first thin adherent coating from a low viscosity slurry containing refractory particles and a binder, applying a fluid suspended mixture of refractory particles and adherent particles of a nucleation catalyst to said coating to cause adherence of said mixture to said coating, said mixture containing from 1 to 50% by weight of said nucleation catalyst, applying a second adherent coating of refractory particles over the thus treated surface of said pattern, then building up successive coats of refractory particles to provide an investment mold structure, and thereafter removing the pattern from the mold structure.

References Cited

UNITED STATES PATENTS

| | | | |
|---|---|---|---|
| 3,019,497 | 2/1962 | Horton et al. | 164—24 |
| 3,157,926 | 11/1964 | Horton et al. | 164—24 |
| 3,259,948 | 7/1966 | Feagin | 164—24 |

J. SPENCER OVERHOLSER, Primary Examiner

J. E. ROETHEL, Assistant Examiner